US009160572B2

(12) United States Patent
Marshall (10) Patent No.: US 9,160,572 B2
(45) Date of Patent: Oct. 13, 2015

(54) AUTOMATED LOCATION DETERMINATION TO SUPPORT VOIP E911 USING SELF-SURVEYING TECHNIQUES FOR AD HOC WIRELESS NETWORK

(75) Inventor: Roger S. Marshall, Auburn, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 962 days.

(21) Appl. No.: 11/907,744

(22) Filed: Oct. 17, 2007

(65) Prior Publication Data

US 2008/0089318 A1    Apr. 17, 2008

Related U.S. Application Data

(60) Provisional application No. 60/852,019, filed on Oct. 17, 2006.

(51) Int. Cl.
| | |
|---|---|
| *H04L 12/66* | (2006.01) |
| *H04M 11/04* | (2006.01) |
| *H04W 76/00* | (2009.01) |

(52) U.S. Cl.
CPC ............ *H04L 12/66* (2013.01); *H04M 11/04* (2013.01); *H04W 76/007* (2013.01)

(58) Field of Classification Search
CPC ............................. H04L 12/66; H04W 76/007
USPC ........ 455/456.2, 404.1, 466, 435.1, 456, 440; 370/328, 331, 338; 340/539.13; 379/45, 37; 709/200, 227; 701/452, 701/208
See application file for complete search history.

(56) References Cited

U.S. PATENT DOCUMENTS

| | | | |
|---|---|---|---|
| 1,103,073 | A | 7/1914 | O'Connel |
| 4,494,119 | A | 1/1985 | Wimbush |
| 4,651,156 | A | 3/1987 | Martinez |
| 4,706,275 | A | 11/1987 | Kamil |
| 4,891,638 | A | 1/1990 | Davis |

(Continued)

FOREIGN PATENT DOCUMENTS

| | | |
|---|---|---|
| WO | WO02/011407 | 2/2002 |
| WO | WO2007/025227 | 3/2007 |

OTHER PUBLICATIONS

International Search Report from PCT/US2007/22088 dated Mar. 12, 2008.

(Continued)

*Primary Examiner* — Parth Patel
(74) *Attorney, Agent, or Firm* — William H. Bollman (57) ABSTRACT

Network devices in an Ad-Hoc wireless network self-survey themselves as necessary for approximate location or precise position information, based on methods employed, particularly useful for a non-open-sky environment. A WiFi Access Point (AP) with or without an internal GPS receiver and location conveyance support may utilize the mesh technique. If an Ad-Hoc network device is unable to contact a suitable location server, or a position request has otherwise failed to deliver a precise position, a WiFi AP is manually configured with appropriate location information, and then offers itself as if it were a location server (thereby becoming an 'internal' server', containing either the determined or provisioned location of itself, for use by other APs or devices). A location server (either internal to the AP needing location, or external), performs a 'mesh' location determination by selecting position information from 3 or more location determined APs for subsequent processing.

7 Claims, 6 Drawing Sheets

FIGURE 4. AP (3,3) gets position based on three mesh determined AP positions (AP(0, 0); AP(1, 1); AP(2, 2)

(56) References Cited

U.S. PATENT DOCUMENTS

| | | | |
|---|---|---|---|
| 4,891,650 | A | 1/1990 | Sheffer |
| 4,952,928 | A | 8/1990 | Carroll et al. |
| 5,014,206 | A | 5/1991 | Scribner et al. |
| 5,043,736 | A | 8/1991 | Darnell et al. |
| 5,055,851 | A | 10/1991 | Sheffer |
| 5,068,656 | A | 11/1991 | Sutherland |
| 5,068,891 | A | 11/1991 | Marshall |
| 5,070,329 | A | 12/1991 | Jasinami |
| 5,081,667 | A | 1/1992 | Drori et al. |
| 5,119,104 | A | 6/1992 | Heller |
| 5,144,283 | A | 9/1992 | Arens et al. |
| 5,161,180 | A | 11/1992 | Chavous |
| 5,177,478 | A | 1/1993 | Wagai et al. |
| 5,193,215 | A | 3/1993 | Olmer |
| 5,208,756 | A | 5/1993 | Song |
| 5,214,789 | A | 5/1993 | George |
| 5,218,367 | A | 6/1993 | Sheffer |
| 5,223,844 | A | 6/1993 | Mansell et al. |
| 5,235,630 | A | 8/1993 | Moody et al. |
| 5,239,570 | A | 8/1993 | Koster et al. .................. 709/203 |
| 5,266,944 | A | 11/1993 | Carrol et al. |
| 5,289,527 | A | 2/1994 | Tiedemann, Jr. |
| 5,293,642 | A | 3/1994 | Lo |
| 5,299,132 | A | 3/1994 | Wortham |
| 5,325,302 | A | 6/1994 | Izidon et al. |
| 5,334,974 | A | 8/1994 | Simms et al. |
| 5,343,493 | A | 8/1994 | Karimullah |
| 5,347,568 | A | 9/1994 | Moody et al. |
| 5,351,235 | A | 9/1994 | Lahtinen |
| 5,361,212 | A | 11/1994 | Class et al. |
| 5,363,425 | A | 11/1994 | Mufti et al. |
| 5,374,936 | A | 12/1994 | Feng |
| 5,379,451 | A | 1/1995 | Nakagoshi et al. |
| 5,381,338 | A | 1/1995 | Wysocki et al. |
| 5,387,993 | A | 2/1995 | Heller |
| 5,388,147 | A | 2/1995 | Grimes |
| 5,390,339 | A | 2/1995 | Bruckert et al. |
| 5,394,158 | A | 2/1995 | Chia |
| 5,396,227 | A | 3/1995 | Carroll et al. |
| 5,398,190 | A | 3/1995 | Wortham |
| 5,406,614 | A | 4/1995 | Hara |
| 5,418,537 | A | 5/1995 | Bird |
| 5,423,076 | A | 6/1995 | Westergreen et al. |
| 5,432,841 | A | 7/1995 | Rimer |
| 5,434,789 | A | 7/1995 | Fraker et al. |
| 5,454,024 | A | 9/1995 | Lebowitz |
| 5,461,390 | A | 10/1995 | Hoshen |
| 5,470,233 | A | 11/1995 | Fruchterman et al. |
| 5,479,482 | A | 12/1995 | Grimes |
| 5,485,161 | A | 1/1996 | Vaughn |
| 5,485,163 | A | 1/1996 | Singere et al. |
| 5,488,563 | A | 1/1996 | Chazelle et al. |
| 5,497,149 | A | 3/1996 | Fast |
| 5,508,931 | A | 4/1996 | Snider |
| 5,513,243 | A | 4/1996 | Kage |
| 5,515,287 | A | 5/1996 | Hakoyama et al. |
| 5,519,403 | A | 5/1996 | Bickley et al. |
| 5,532,690 | A | 7/1996 | Hertel |
| 5,535,434 | A | 7/1996 | Siddoway et al. |
| 5,539,398 | A | 7/1996 | Hall et al. |
| 5,543,776 | A | 8/1996 | L'Esperance et al. |
| 5,552,772 | A | 9/1996 | Janky et al. |
| 5,555,286 | A | 9/1996 | Tendler |
| 5,568,119 | A | 10/1996 | Schipper et al. |
| 5,574,648 | A | 11/1996 | Pilley |
| 5,579,372 | A | 11/1996 | Astrom |
| 5,588,009 | A | 12/1996 | Will |
| 5,592,535 | A | 1/1997 | Klotz |
| 5,604,486 | A | 2/1997 | Lauro et al. |
| 5,606,313 | A | 2/1997 | Allen et al. |
| 5,606,850 | A | 3/1997 | Nakamura |
| 5,610,815 | A | 3/1997 | Gudat et al. |
| 5,614,890 | A | 3/1997 | Fox |
| 5,615,116 | A | 3/1997 | Gudat et al. |
| 5,621,793 | A | 4/1997 | Bednarek et al. |
| 5,628,051 | A | 5/1997 | Salin |
| 5,633,912 | A | 5/1997 | Tsoi |
| 5,673,306 | A | 9/1997 | Amadon et al. |
| 5,682,600 | A | 10/1997 | Salin |
| 5,692,037 | A | 11/1997 | Friend |
| 5,740,534 | A | 4/1998 | Ayerst et al. |
| 5,761,618 | A | 6/1998 | Lynch et al. |
| 5,767,795 | A | 6/1998 | Schaphorst |
| 5,768,509 | A | 6/1998 | Gunluk |
| 5,774,533 | A | 6/1998 | Patel |
| 5,787,357 | A | 7/1998 | Salin |
| 5,794,142 | A | 8/1998 | Vanttila et al. |
| 5,797,091 | A | 8/1998 | Clise et al. |
| 5,797,094 | A | 8/1998 | Houde |
| 5,797,096 | A | 8/1998 | Lupien et al. |
| 5,802,492 | A | 9/1998 | Delorme et al. |
| 5,806,000 | A | 9/1998 | Vo et al. |
| 5,822,700 | A | 10/1998 | Hult et al. |
| 5,828,740 | A | 10/1998 | Khuc et al. |
| 5,905,736 | A | 5/1999 | Rohen et al. |
| 5,920,821 | A | 7/1999 | Seaholtz et al. |
| 5,930,701 | A | 7/1999 | Skog |
| 5,943,399 | A | 8/1999 | Bannister et al. |
| 5,946,629 | A | 8/1999 | Sawyer et al. |
| 5,946,630 | A | 8/1999 | Willars et al. |
| 5,950,130 | A | 9/1999 | Coursey |
| 5,953,398 | A | 9/1999 | Hill |
| 5,974,054 | A | 10/1999 | Couts et al. |
| 5,978,685 | A | 11/1999 | Laiho |
| 5,987,323 | A | 11/1999 | Huotari |
| 5,999,811 | A | 12/1999 | Molne |
| 6,035,025 | A | 3/2000 | Hanson |
| 6,049,710 | A | 4/2000 | Nilsson |
| 6,058,300 | A | 5/2000 | Hanson |
| 6,064,875 | A | 5/2000 | Morgan |
| 6,070,067 | A | 5/2000 | Nguyen et al. |
| 6,075,982 | A | 6/2000 | Donovan et al. |
| 6,081,508 | A | 6/2000 | West et al. |
| 6,101,378 | A | 8/2000 | Barabash et al. |
| 6,122,503 | A | 9/2000 | Daly |
| 6,122,520 | A | 9/2000 | Want et al. |
| 6,148,197 | A | 11/2000 | Bridges et al. |
| 6,148,198 | A | 11/2000 | Anderson et al. |
| 6,149,353 | A | 11/2000 | Nilsson |
| 6,169,891 | B1 | 1/2001 | Gorham et al. |
| 6,173,181 | B1 | 1/2001 | Losh |
| 6,181,935 | B1 | 1/2001 | Gossman et al. |
| 6,188,752 | B1 | 2/2001 | Lesley |
| 6,198,431 | B1 | 3/2001 | Gibson |
| 6,199,045 | B1 | 3/2001 | Giniger et al. |
| 6,205,330 | B1 | 3/2001 | Winbladh |
| 6,208,854 | B1 | 3/2001 | Roberts et al. |
| 6,223,046 | B1 | 4/2001 | Hamill-Keays et al. |
| 6,226,529 | B1 | 5/2001 | Bruno et al. |
| 6,249,680 | B1 | 6/2001 | Wax et al. |
| 6,249,744 | B1 | 6/2001 | Morita |
| 6,266,614 | B1 | 7/2001 | Alumbaugh et al. |
| 6,289,373 | B1 | 9/2001 | Dezonno |
| 6,317,594 | B1 | 11/2001 | Gossman et al. |
| 6,327,479 | B1 | 12/2001 | Mikkola |
| 6,396,913 | B1 | 5/2002 | Perkins et al. |
| 6,526,026 | B1 | 2/2003 | Menon |
| 6,529,722 | B1 | 3/2003 | Heinrich |
| 6,621,810 | B1 | 9/2003 | Leung |
| 6,675,017 | B1 | 1/2004 | Zellner |
| 6,677,894 | B2 | 1/2004 | Sheynblat |
| 6,721,396 | B2 | 4/2004 | Chin |
| 6,728,545 | B1* | 4/2004 | Belcea ....................... 455/456.2 |
| 6,744,858 | B1 | 6/2004 | Ryan |
| 6,795,444 | B1 | 9/2004 | Vo |
| 6,799,049 | B1 | 9/2004 | Zellner |
| 6,937,597 | B1 | 8/2005 | Rosenburg |
| 7,020,480 | B2 | 3/2006 | Coskun |
| 7,092,385 | B2 | 8/2006 | Gallant |
| 7,184,418 | B1 | 2/2007 | Baba |
| 7,200,380 | B2 | 4/2007 | Havlark |
| 7,260,186 | B2 | 8/2007 | Zhu |
| 7,353,031 | B2* | 4/2008 | Shi et al. .................... 455/456.1 |
| 7,366,157 | B1 | 4/2008 | Valentine |

(56) References Cited

U.S. PATENT DOCUMENTS

| | | | |
|---|---|---|---|
| 7,440,442 | B2 | 10/2008 | Grabelsky |
| 7,522,581 | B2 | 4/2009 | Acharya |
| 7,702,081 | B1 | 4/2010 | Klesper |
| 7,822,391 | B1 | 10/2010 | Delker |
| 7,895,263 | B1 | 2/2011 | Kirchmeier |
| 8,014,945 | B2 * | 9/2011 | Cooper et al. ............... 701/452 |
| 2002/0086659 | A1 | 7/2002 | Lauper |
| 2002/0184418 | A1 * | 12/2002 | Blight ........................... 710/100 |
| 2003/0086539 | A1 | 5/2003 | McCalmont |
| 2003/0125045 | A1 * | 7/2003 | Riley et al. .................... 455/456 |
| 2003/0186709 | A1 | 10/2003 | Rhodes |
| 2003/0217150 | A1 * | 11/2003 | Roese et al. .................. 709/225 |
| 2004/0176123 | A1 | 9/2004 | Chin |
| 2004/0185822 | A1 * | 9/2004 | Tealdi et al. ............... 455/404.1 |
| 2004/0215687 | A1 * | 10/2004 | Klemba et al. ................ 709/200 |
| 2004/0225740 | A1 * | 11/2004 | Klemba et al. ................ 709/227 |
| 2004/0258013 | A1 * | 12/2004 | Belcea .......................... 370/328 |
| 2004/0259555 | A1 * | 12/2004 | Rappaport et al. ............ 455/446 |
| 2004/0267445 | A1 | 12/2004 | De Luca |
| 2005/0001720 | A1 * | 1/2005 | Mason et al. ............ 340/539.13 |
| 2005/0031095 | A1 | 2/2005 | Pietrowicz |
| 2005/0053209 | A1 | 3/2005 | D'Evelyn |
| 2005/0119012 | A1 | 6/2005 | Merheb |
| 2005/0135569 | A1 * | 6/2005 | Dickinson et al. ............. 379/45 |
| 2005/0170843 | A1 * | 8/2005 | Billhartz et al. ........... 455/456.1 |
| 2005/0190892 | A1 | 9/2005 | Dawson |
| 2005/0201358 | A1 | 9/2005 | Nelson |
| 2005/0201528 | A1 | 9/2005 | Meer |
| 2005/0201529 | A1 | 9/2005 | Nelson |
| 2005/0213716 | A1 * | 9/2005 | Zhu et al. ........................ 379/45 |
| 2005/0233748 | A1 * | 10/2005 | Robinson et al. ............. 455/440 |
| 2005/0282518 | A1 | 12/2005 | D'Evelyn |
| 2005/0282557 | A1 * | 12/2005 | Mikko et al. ............... 455/456.1 |
| 2005/0287979 | A1 | 12/2005 | Rollender |
| 2006/0019679 | A1 * | 1/2006 | Rappaport et al. .......... 455/456.5 |
| 2006/0025154 | A1 | 2/2006 | Alapuranen et al. |
| 2006/0058951 | A1 * | 3/2006 | Cooper et al. ................ 701/208 |
| 2006/0109960 | A1 | 5/2006 | D'Evelyn |
| 2006/0217132 | A1 * | 9/2006 | Drummond-Murray et al. ........................... 455/456.2 |
| 2006/0239205 | A1 | 10/2006 | Warren |
| 2006/0281470 | A1 * | 12/2006 | Shi et al. .................... 455/456.2 |
| 2006/0293066 | A1 | 12/2006 | Edge |
| 2007/0010248 | A1 * | 1/2007 | Dravida et al. ............ 455/435.1 |
| 2007/0021098 | A1 | 1/2007 | Rhodes |
| 2007/0026871 | A1 | 2/2007 | Wager |
| 2007/0060097 | A1 | 3/2007 | Edge |
| 2007/0082677 | A1 * | 4/2007 | Donald Hart et al. ...... 455/456.1 |
| 2007/0117574 | A1 | 5/2007 | Watanabe |
| 2007/0117577 | A1 | 5/2007 | Harris |
| 2007/0149213 | A1 | 6/2007 | Lamba |
| 2007/0201623 | A1 * | 8/2007 | Hines et al. ..................... 379/37 |
| 2007/0206568 | A1 | 9/2007 | Silver |
| 2007/0206613 | A1 | 9/2007 | Silver |
| 2007/0219705 | A1 * | 9/2007 | Bitar et al. .................... 701/200 |
| 2007/0253429 | A1 | 11/2007 | James |
| 2007/0281689 | A1 * | 12/2007 | Altman et al. ............. 455/435.1 |
| 2008/0045250 | A1 | 2/2008 | Hwang |
| 2008/0081646 | A1 * | 4/2008 | Morin et al. ................... 455/466 |
| 2008/0089288 | A1 * | 4/2008 | Anschutz et al. ............. 370/331 |
| 2008/0117859 | A1 | 5/2008 | Shahidi |
| 2008/0137624 | A1 * | 6/2008 | Silverstrim et al. ........... 370/338 |
| 2008/0192731 | A1 | 8/2008 | Dickinson |
| 2009/0003535 | A1 | 1/2009 | Grabelsky |
| 2009/0128404 | A1 | 5/2009 | Martino |
| 2009/0221263 | A1 | 9/2009 | Titus |
| 2009/0237210 | A1 | 9/2009 | Ciesla |
| 2010/0076767 | A1 | 3/2010 | Vieri |
| 2010/0198933 | A1 | 8/2010 | Smith |
| 2010/0233991 | A1 | 9/2010 | Crawford |
| 2011/0207429 | A1 | 8/2011 | Maier |

OTHER PUBLICATIONS

International Search Report from PCT/US2007/21133 dated Apr. 21, 2008.

47 code of federal regulations (Oct. 1, 2005 Edition).

Agre et al., A Layered Architecture for Location-based Services in Wireless Ad Hoc Networks, IEEE.

International Search Report from PCT/US2007/22088 dated Nov. 6, 2008.

Intrado Inc., Qwest Detailed SR/ALI to MPC/GMLC Interface Specification to TCP/IP Implementation of TIA/EIA/J-STD-036 E2 with Phase I Location Description Addition, Intrado Informed Response; Apr. 2004; Issue 1.11; pp. 1-57.

Schulzrinne et al., Emergency Services for Internet Telephony Systems draft-schulzrinne-sipping-emergency-arch, IETF Standard Working Draft, Feb. 4, 2004, 1-22.

International Search Report received in PCT/US2012/067857 dated Feb. 20, 2013.

International Search Report received in PCT/US2012/67689 dated Feb. 22, 2013.

* cited by examiner

FIGURE 2. AP (0,0) gets position based on baseline AP positions

FIG. 4

FIGURE 3. AP (1,1) gets position based on two baseline AP positions and one mesh determined AP (0,0)

FIGURE 4. AP (3,3) gets position based on three mesh determined AP positions (AP(0, 0); AP(1, 1); AP(2, 2))

FIG. 6
(PRIOR ART)

AUTOMATED LOCATION DETERMINATION TO SUPPORT VOIP E911 USING SELF-SURVEYING TECHNIQUES FOR AD HOC WIRELESS NETWORK

The present application claims priority from U.S. Provisional Appl. No. 60/852,019, entitled "Automated Location Determination to Support VoIP E911 Using Self-Surveying Techniques for Ad Hoc Wireless Network" filed on Oct. 17, 2006, the entirety of which is expressly incorporated herein by reference.

BACKGROUND OF THE INVENTION

1. Field of the Invention

This invention relates generally to wireless services. More particularly, it relates to voice over Internet Protocol (VoIP) and location based services, specifically automated location determination to support location based VoIP E911 wireless services.

2. Background of the Related Art

Figure 6:
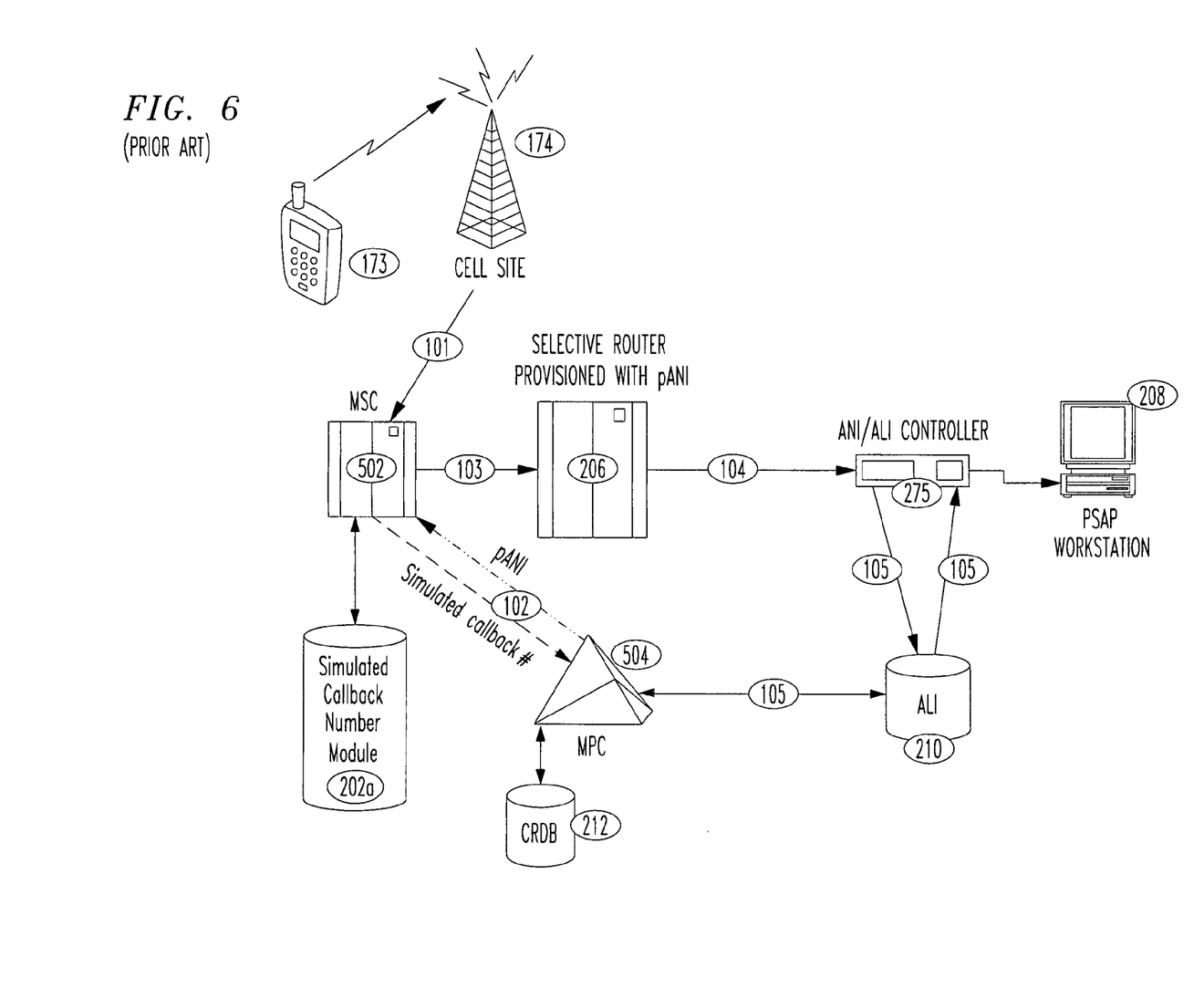
FIG. 6 shows conventional elements relating to routing of an E911 call from a cell phone.

The FCC has mandated that all wireless phones must be able to dial 9-1-1, even if other service is denied. FIG. 6 shows conventional elements relating to routing of an E911 call from a cell phone.

In particular, as shown in FIG. 6, a conventional wireless carrier's mobile switching center (MSC) 502 contacts a Mobile Positioning Center (MPC) 504 to ascertain proper routing of an E911 call. The MPC 504 responds with routing information and the MSC 502 then routes the call to the correct PSAP 208. The MPC 504 stores the caller's call-back number and location in a dynamic database and relays that information to the PSAP 208 at the appropriate time.

Wireless telephones initially communicated with base stations using long range wireless communications technologies, e.g., TDMA, CDMA, GSM, etc. As technologies advanced, communication technologies moved to voice over Internet protocol (VoIP) communications technologies. More recently, wireless fidelity (WiFi) and similar hot spot access points to the Internet have permitted wireless access to VoIP type communications technologies.

Location based services provide a location of a wireless device. Technologies have been developed for locating with some accuracy users of traditional TDMA, CDMA and GSM networks. However, providing the location of an Internet user, e.g., communicating using VoIP technology, is significantly more challenging, especially if the Internet user is a wireless user.

There is a need for improved apparatus and techniques for providing location of a user in a LAN wireless network, e.g., a WiFi network.

SUMMARY OF THE INVENTION

In accordance with the principles of the present invention, a method and apparatus for obtaining location information using self-surveying location based technique in a Voice over Internet Protocol (VoIP) network comprises establishing contact between a requesting wireless network device and an Ad-Hoc wireless network. Location information, both position and measurement information relevant to at least three other members of the Ad-Hoc wireless network is obtained. The obtained position and measurement information relevant to the at least three other members of the Ad-Hoc wireless network are meshed into either an approximate location or precise position of the requesting wireless network device. In this way, members of the Ad-Hoc wireless network are able to obtain location information even in a non-open sky environment.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

For conventional wireless systems, e.g., including a network of WiFi Access Points, real-time location might be provided based on either: (1) pre-provisioned survey data into a WiFi network access point configuration, which can be input and used for macro or "cell-level-routing", in real-time; or (2) Global positioning system (GPS) or assisted GPS (AGPS)-based location determination technology built into WiFi network access points that can be used to directly "locate" a handset via triangulation techniques. However, location provision using these solutions would not work well indoors (i.e., non-open-sky conditions), and/or do not provide a way for non-surveyed or non-provisioned WiFi network access points to automatically obtain their own location information based on information which is known by other adjacent WiFi access points.

The present inventors have appreciated that with the use of WiFi as an Access Point (AP) for telecommunications, a subscriber (i.e., "user"), will have a need to provide a WiFi device's (i.e., "handset") position. This position (or location) is desired to initiate an Internet Protocol (IP) enabled location-based service request. An exemplary IP communication technology is voice over Internet protocol (VoIP).

In a disclosed embodiment, an E9-1-1 emergency service request (alternatively referred to as an "emergency call") is placed on a local area network (LAN) device, e.g., a WiFi network device. Conventional WiFi devices using a WiFi network via one or more WiFi Access Point nodes are conventionally not able to accurately provide appropriate (i.e., precise) location information in all situations sufficient to satisfy requirements of an emergency service.

While location must be provided for proper routing, a course location would be sufficient to route. However, precise location must be provided to a PSAP for dispatching emergency responders. Thus, accurate, precise location information is necessary for an emergency service to properly receive and then respond to a 911 call. For the appropriate emergency service to even receive the emergency call, the location must be provided so that the emergency call can be routed to a geographically appropriate public safety access point (PSAP). Precise location information is then also required for use by the responding PSAP so that emergency services can be dispatched to the appropriate specific location to assist the user if necessary.

Disclosed embodiments of the present invention provide a method for reliably and automatically determining location for wireless devices, particularly for those communicating via a local area network (LAN) as necessary through a self-survey technique using wireless mesh network end devices within obstructed (e.g., "non-open-sky") environments.

Figure 1:
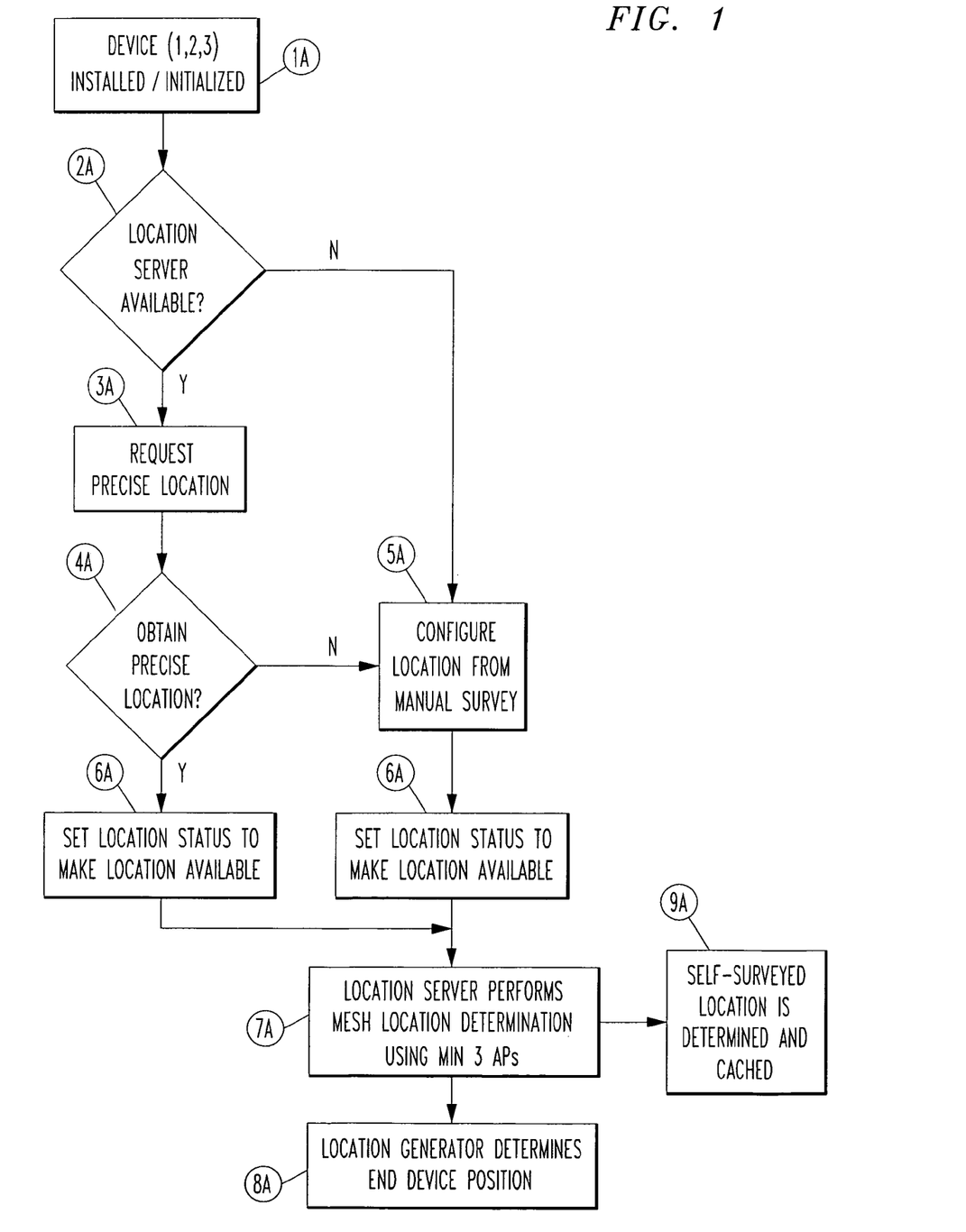
FIG. 1 is a flowchart showing an exemplary baseline location process determined using a baseline access point (AP) location configuration, in accordance with the principles of the present invention.

FIG. 1 is a flowchart showing an exemplary baseline location process determined using a baseline access point (AP) location configuration, in accordance with the principles of the present invention.

In particular, as shown in step 1A of FIG. 1, a WiFi Access Point (AP) with or without an internal GPS receiver and location conveyance support is connected to a network as a functioning IP node, but in this example has no location information associated with it yet.

In step 2A, the AP queries to determine if it has access to obtain its location from either an internal or external location server.

In step 3A, if a location server is available, the AP requests its own position (i.e., precise location). Otherwise, if a location server is not available, the process jumps from step 2A to step 5A.

In step 4A, a precise position fix is requested from the location server.

In step 5A, in the case that no location server exists, or that a position request failed to deliver a precise position, the AP is manually configured with appropriate location information (e.g., lat/lon).

In step 6A, once precise location has been obtained by the relevant AP, the AP offers itself as if it were a location server (thereby becoming an 'internal' server', containing either the determined or provisioned location of itself, for use by other APs or devices.

Determination of a location is traditionally performed based on some math against some measurement data (though might be done by vicinity 'averaging' the visible positions (lat/lons) to get an approximate (course) position). Not only is measurement data alone required, but also the positions where the measurement data is measured from. In step 7A, the location server (either internal to the AP needing location, or external), performs a 'mesh' location determination. The mesh location determination selects position and/or measurement information from 3 or more location determined APs for subsequent processing.

The 3 (or more) meshed locations may be processed into a single estimated location in any appropriate manner. As an example, the 3 (or more) locations may be averaged to obtain a 'mesh' location for the relevant requesting AP. Alternatively, a mean position may be determined (e.g., in latitudinal/longitudinal coordinates).

In step 8A, a location generator determines the end device position based on the precise position that was returned.

In step 9A, the AP preferably makes itself available for other AP/location server processing (iterative mesh processing for location determination of other nodes or end devices).

Figure 2:
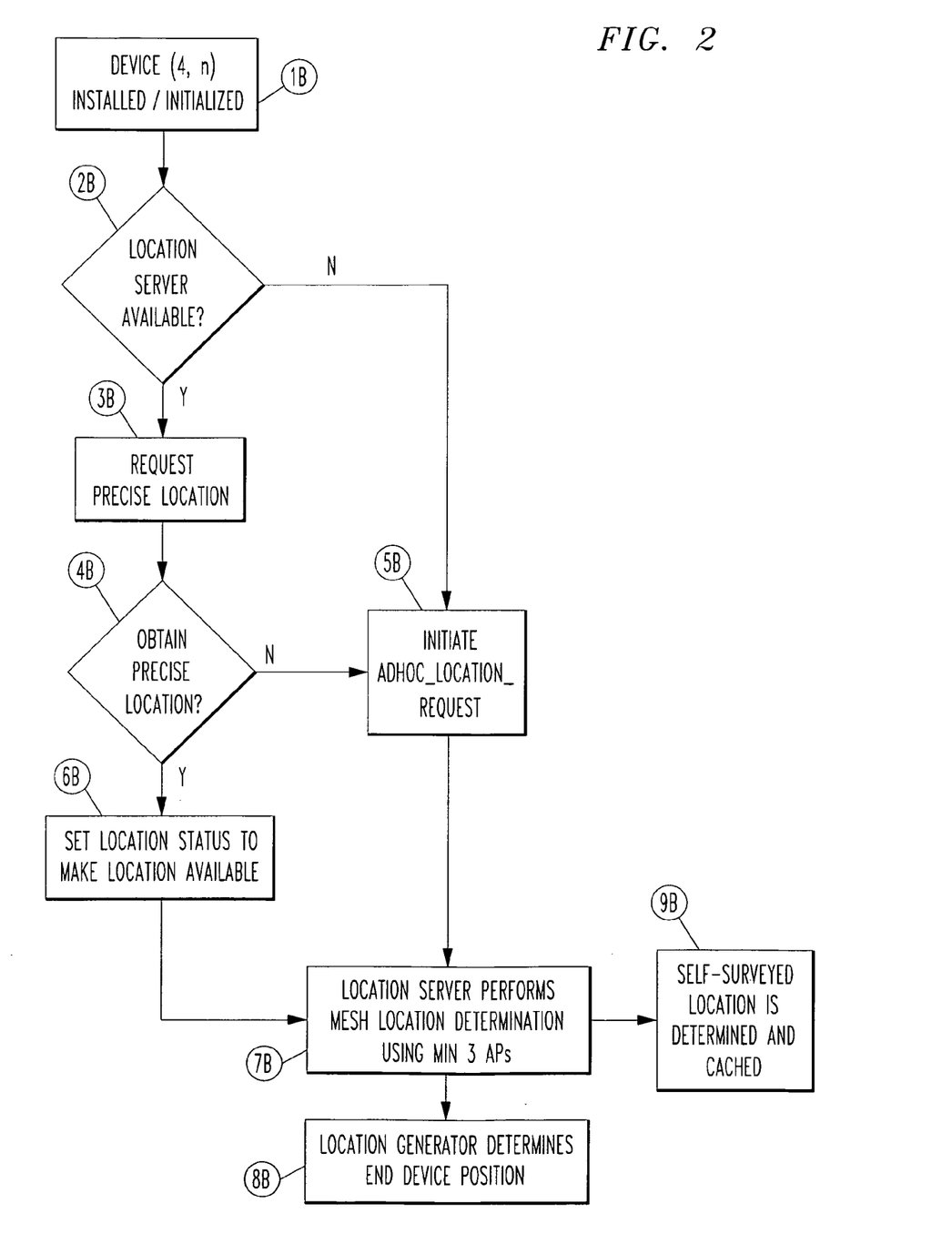
FIG. 2 is a flowchart showing an exemplary mesh determined location process that provides a dynamic access point (AP) location based on self-surveyed position information, in accordance with the principles of the present invention.

FIG. 2 is a flowchart showing an exemplary mesh determined location process that provides a dynamic access point (AP) location based on self-surveyed position information, in accordance with the principles of the present invention.

In particular, as shown in step 1B of FIG. 2, a WiFi Access Point (AP) needing location information may or may not have an internal GPS receiver. Location conveyance support is provided to such a WiFi AP connected to a network as a functioning IP node. In the shown embodiment, a WiFi AP has no location information associated with it yet.

In step 2B, an AP attempts to obtain its location from either an internal or an external location server.

In step 3B, if a location server is available, the AP requests its own position. On the other hand, if a location server is not available, the process advances from step 2B to step 5B.

In step 4B, a precise position fix is requested from the location server.

In step 5B, in the case that the new AP (without location information) is in an obstructed physical environment (e.g., indoors) or otherwise is unable to obtain real-time suitable location information from a remote GPS/AGPS or other network-based (e.g., TDOA) location server designed to provide a precise position. Because the conventional source of location information is unreachable or ineffective, the AP initiates a location request to a local location server. In the exemplary embodiment, the local location server is aware of adjacent AP nodes that have a position available.

In step 6B, just as in step 6A, the AP offers itself as a location server, containing either the determined or provisioned location of itself, for use by other APs or devices.

In step 7B, just as in step 7A, the location server (either internal to the AP needing location, or external), selects position and/or measurement information from 3 or more location determined APs for subsequent processing.

In step 8B, just as in step 8A, a location generator determines precise position for the AP based on a location server request.

In step 9B, just as in step 9A, the AP makes itself available for other AP/location server processing (iterative mesh processing for location determination of other nodes or end devices).

Figure 3:
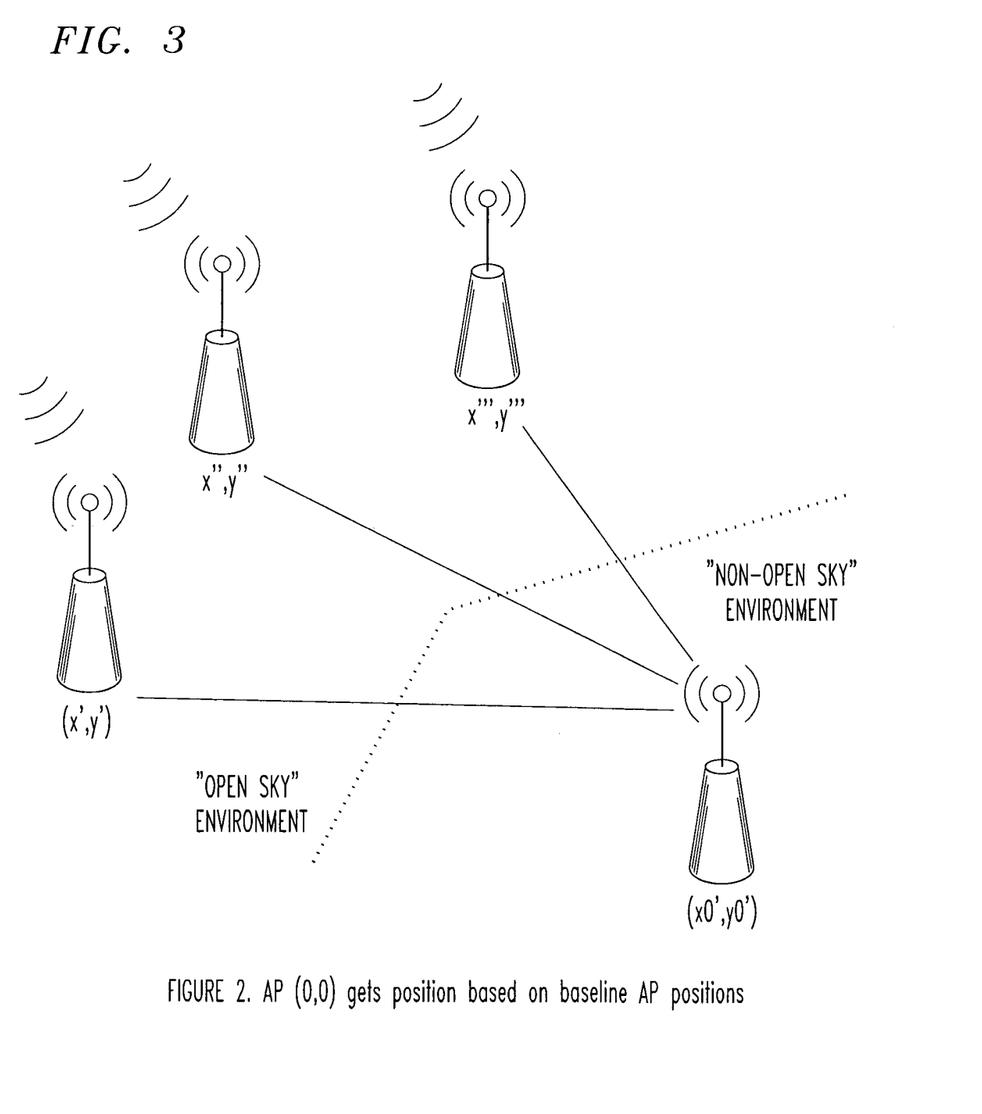
FIG. 3 shows a WiFi access point (AP) (0,0) getting position based on baseline access point positions, in accordance with the principles of the present invention.

FIG. 3 shows a WiFi access point (AP) (0,0) getting position based on baseline access point positions, in accordance with the principles of the present invention.

In particular, as shown in FIG. 3, Access Point (x0,y0) gets its position from three baseline AP positions (x',y'), (x'',y''), and (x''',y''') located outside the non-open sky environment.

Figure 4:
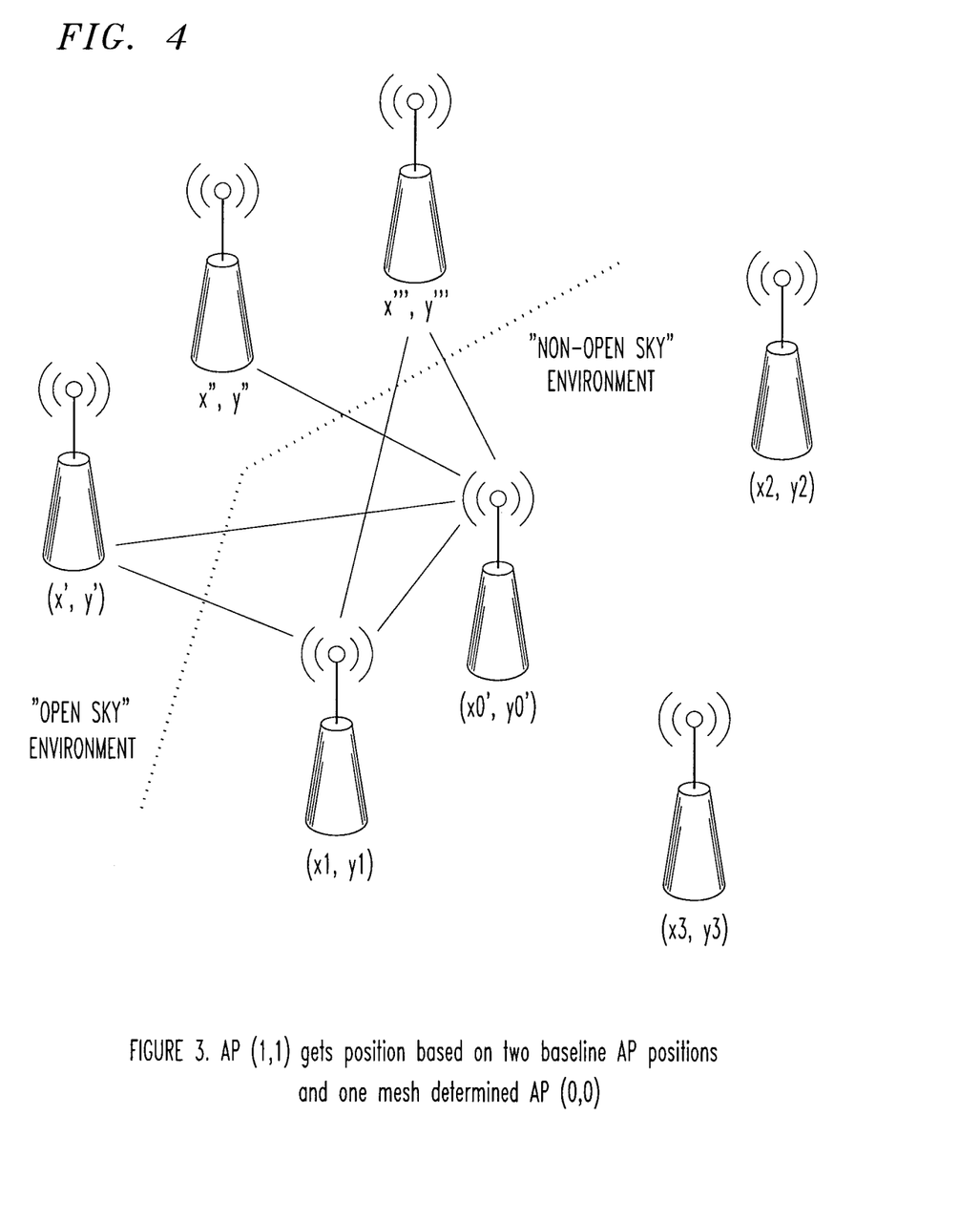
FIG. 4 shows a WiFi access point (AP) (1,1) getting position based on two baseline WiFi access point positions and one mesh determined access point (0,0), in accordance with the principles of the present invention.

FIG. 4 shows a WiFi access point (AP) (x1,y1) that finds itself in a non-open sky environment getting its position based on two baseline WiFi access point positions and one mesh determined access point (0,0), in accordance with the principles of the present invention.

In particular, as shown in FIG. 4, Access Point (x1,y1) gets its position from two baseline AP positions (x',y') and (x''',y''') located outside the non-open sky environment, and a 'mesh' determined access point (x0,y0) that is also located in the same WiFi network, and thus in the same non-open sky environment.

Figure 5:
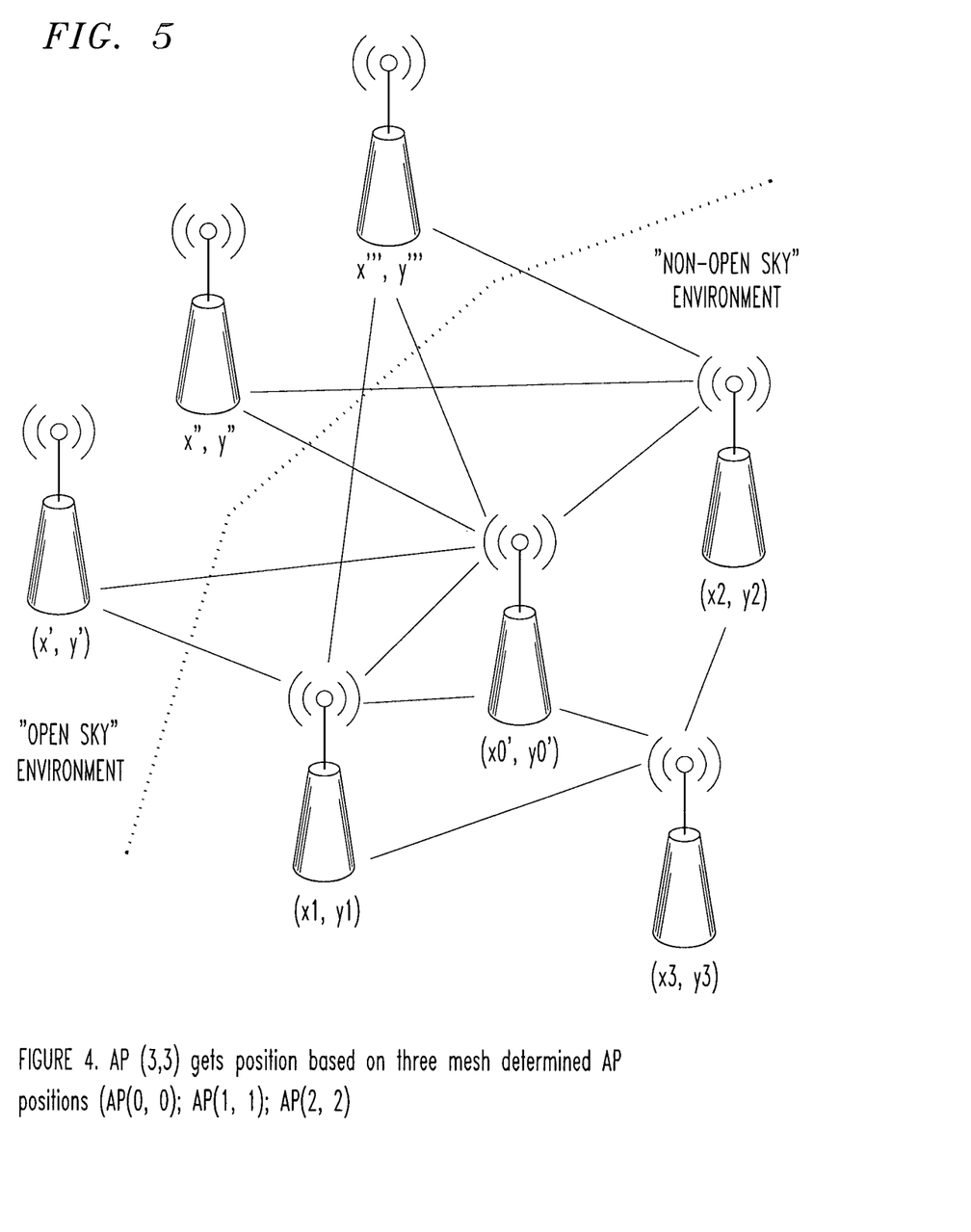
FIG. 5 shows a WiFi access point (AP) (3,3) getting position based on three mesh determined WiFi access point positions (0,0); (1,1); (2,2), in accordance with the principles of the present invention.

FIG. 5 shows a WiFi access point (AP) (3,3) getting position based on three mesh determined WiFi access point positions (0,0); (1,1); (2,2), in accordance with the principles of the present invention.

In particular, as shown in FIG. 5, Access Point (x3,y3) gets its position from three 'mesh' determined access points (x0,y0), (x1,y1) and (x2,y2) that are also located in the same WiFi network, and thus in the same non-open sky environment.

In this way, members of an Ad-Hoc wireless network can automatically determine location using a self-surveying technique functional even in a non-open sky environment.

Note that while the exemplary embodiments relate to WiFi, the invention is equally applicable to any wireless technology that requires automatic location determination.

This concept has been discussed at length for non-emergency purposes, but has not been applied to voice over Internet Protocol (VoIP) E9-1-1 location-based calling. For instance, see the attached whitepaper entitled: *A Layered Architecture for Location-based Services in Wireless Ad Hoc Networks*, By Jonathan Agre, Adedji Akinyemi, Lusheng Ji, Ryusuke Masuoka and Pankaj Thakkar of Fujitsu Laboratories of America.

The presented solution offers a simpler, less costly way to maintain precise end device location in dynamic wireless mesh networks, without having to manually effect network configurations or deploy alternate location technology equipment. This network solution provides a path for wireless carriers to migrate from existing network core location determination technologies and simultaneously support newer packet-based device technology deployment.

Likely users of the present invention include WiFi access network service providers; and traditional wireless telecommunication operators to support fixed mobile convergence technology deployment. Voice Over Internet Protocol (VoIP) E9-1-1 market players are also potential benefactors of the invention, as are any US GSM carrier that supports PCS frequencies used by foreign markets. Also, companies which manufacture or market wireless end devices, (e.g., WiFi APs) (e.g., Cisco, Nortel, etc.); VoIP operators supporting Mobile/Nomadic International subscribers; and VoIP operators desiring to meet government communications mandate guidelines for E9-1-1.

Competing technologies include those publicly provided by the CISCO™ company pursuant to their acquisition of AirSpace that occurred sometime around 2004.

While the invention has been described with reference to the exemplary embodiments thereof, those skilled in the art will be able to make various modifications to the described embodiments of the invention without departing from the true spirit and scope of the invention.

What is claimed is:

1. A method of obtaining location information in an Internet Protocol (IP) network, comprising:
    requesting, by a wireless network device, first location information from a first member device of a given wireless fidelity (WiFi) network;
    requesting, by said wireless network device, second location information from a second member device of said given WiFi network;
    requesting, by said wireless network device, third location information from a third member device of said given WiFi network;
    meshing said first location information, said second location information, and said third location information, into a single meshed location associated with said wireless network device;
    determining the meshed location comprising a meshed latitude that is a mean of individual latitude of each of said three locations and a meshed longitude that is a mean of individual longitude of said three locations; and
    providing said meshed location to a WiFi network Access Point AP, as location information for said wireless network device;
    wherein said first location information, said second location information, and said third location information are all also meshed locations.

2. The method of obtaining location information in an Internet Protocol (IP) network according to claim 1, wherein:
    said WiFi network AP is part of a local area network (LAN).

3. The method of obtaining location information in an Internet Protocol (IP) network according to claim 1, wherein:
    said WiFi network AP services at least one Voice over Internet Protocol (VoIP) device.

4. The method of obtaining location information in an Internet Protocol (IP) network according to claim 1, further comprising:
    supporting an E911 emergency call to a user of said wireless network device.

5. The method of obtaining location information in an Internet Protocol (IP) network according to claim 1, wherein said first member device, said second member device, and said third member device comprise:
    at least one network member device currently capable of having its location information obtained only via an averaging technique.

6. The method of obtaining location information in an Internet Protocol (IP) network according to claim 1, wherein said first member device, said second member device, and said third member device comprise:
    at least two network member devices currently capable of having their location information each obtained only via an averaging technique.

7. The method of obtaining location information in an Internet Protocol (IP) network according to claim 1, wherein said first member device, said second member device, and said third member device comprise:
    at least three network member devices currently capable of having their location information each obtained only via an averaged technique.

* * * * *